(12) United States Patent
Lee et al.

(10) Patent No.: US 12,308,405 B2
(45) Date of Patent: May 20, 2025

(54) BATTERY MODULE

(71) Applicant: SK On Co., Ltd., Seoul (KR)

(72) Inventors: Eung Ho Lee, Daejeon (KR); Sang Tae An, Daejeon (KR); Hyo Seong An, Daejeon (KR); Ho Seong Jang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/324,169

(22) Filed: May 26, 2023

(65) Prior Publication Data

US 2023/0395893 A1 Dec. 7, 2023

(30) Foreign Application Priority Data

Jun. 7, 2022 (KR) .......................... 10-2022-0069028

(51) Int. Cl.
  *H01M 10/653* (2014.01)
  *H01M 10/04* (2006.01)
  *H01M 50/30* (2021.01)
  *H01M 50/505* (2021.01)

(52) U.S. Cl.
  CPC ..... *H01M 10/653* (2015.04); *H01M 10/0481* (2013.01); *H01M 50/30* (2021.01); *H01M 50/505* (2021.01)

(58) Field of Classification Search
  CPC .......... H01M 10/653; H01M 10/0481; H01M 50/30; H01M 50/505; H01M 10/613; H01M 10/647; H01M 50/209; H01M 50/211; H01M 50/507; H01M 10/658; H01M 50/24; H01M 50/242; H01M 50/502; Y02E 60/10

See application file for complete search history.

(56) References Cited

U.S. PATENT DOCUMENTS

| | | | |
|---|---|---|---|
| 2007/0196729 A1* | 8/2007 | Yamauchi | H01M 50/417 429/130 |
| 2020/0220240 A1* | 7/2020 | Cheng | H01M 10/6556 |
| 2021/0028517 A1 | 1/2021 | Choi et al. | |
| 2021/0074960 A1* | 3/2021 | Stude | B32B 15/14 |
| 2021/0320374 A1* | 10/2021 | Lee | H01M 10/6566 |
| 2022/0251749 A1* | 8/2022 | Borchardt | H01M 50/249 |

(Continued)

FOREIGN PATENT DOCUMENTS

| CN | 111584784 A | 8/2020 |
|---|---|---|
| CN | 113067107 A | 7/2021 |

(Continued)

OTHER PUBLICATIONS

Extended European Search Report for European Patent Application No. 23176901.9 issued by the European Patent Office on Nov. 4, 2024.

*Primary Examiner* — Lisa S Park
(74) *Attorney, Agent, or Firm* — IP & T GROUP LLP

(57) ABSTRACT

A battery module is disclosed. In some implementations, the battery module includes: a housing having an internal space, a cell stack in which a plurality of battery cells and a first heat blocking member blocking heat propagation between the plurality of battery cells are stacked, and a second heat blocking member disposed between the cell stack and the housing, wherein at least a portion of the first heat blocking member is in contact with the second heat blocking member.

16 Claims, 8 Drawing Sheets

(56) References Cited

U.S. PATENT DOCUMENTS

2022/0271388 A1\* 8/2022 Choi .................. H01M 50/271
2023/0155243 A1   5/2023 Lee et al.

FOREIGN PATENT DOCUMENTS

| CN | 214411321 U    | 10/2021 |
| KR | 10-2266391 B1  | 6/2021  |
| WO | 2022080908 A1  | 4/2022  |

\* cited by examiner

BATTERY MODULE

CROSS-REFERENCE TO RELATED APPLICATION(S)

This patent document claims the priority and benefits of Korean Patent Application No. 10-2022-0069028 filed on Jun. 7, 2022, the disclosure of which is incorporated herein by reference in its entirety.

TECHNICAL FIELD

The technology and implementations disclosed in this patent document generally relate to a battery module.

BACKGROUND

Secondary batteries, unlike primary batteries, may be charged and discharged, and thus, the secondary batteries may be applied to devices within various fields, such as digital cameras, mobile phones, laptop computers, hybrid vehicles, and electric vehicles. Secondary batteries include nickel-cadmium batteries, nickel-metal hydride batteries, nickel-hydrogen batteries, lithium secondary batteries, and the like.

These secondary batteries are manufactured as flexible pouch-type battery cells or rigid prismatic or cylindrical can-type battery cells, and a plurality of battery cells are electrically connected to be used. Here, the plurality of battery cells form a stacked cell stack and are disposed inside a housing to configure a battery device, such as a battery module or a battery pack.

Meanwhile, the occurrence of various events, such as when a battery cell reaches an end of life, when a swelling phenomenon occurs in the battery cell, when the battery cell is overcharged, when the battery cell is exposed to heat, when a sharp object, such as a nail, penetrates an exterior material of the battery cell, or when an external impact is applied to the battery cell, may lead to ignition of the battery cell. Flames or high-temperature gas spouted from the battery cell may cause chain ignition of other adjacent battery cells accommodated in the battery device and cause thermal runaway.

In particular, when flames, high-temperature gases, and conductive particles spouted from the battery cell freely flow inside a battery module, they may directly ignite other adjacent battery cells or cause a short circuit between components of the battery module, resulting in further deterioration of the thermal runaway situation. In addition, such flames or high-temperature gases may melt compressive pads or the housing adjacent to battery cells, thereby making it impossible to control thermal runaway of the battery module.

Therefore, a discharge structure capable of properly discharging flames or high-temperature gases spouted from the battery cell so as not to affect other battery cells is required. In addition, a structure capable of properly blocking such flames or high-temperature gases from indiscriminately flowing inside the battery module is required.

SUMMARY

The disclosed technology may be implemented in some embodiments to provide a battery module capable of inducing a high-temperature gas or flames occurring in a battery cell to flow along a predetermined path.

The disclosed technology may be implemented in some embodiments to provide a battery module capable of blocking heat propagation between neighboring battery cells and preventing a high-temperature gas or flames from indiscriminately flowing between a cell stack and a housing.

The disclosed technology may be implemented in some embodiments to provide a battery module including a plurality of heat blocking members in contact, to be engaged with each other, and effectively blocking the propagation of high-temperature gas or flames occurring in a battery cell to an internal space of the battery module.

In some embodiments of the disclosed technology, a battery module includes: a housing having an internal space; a cell stack in which a plurality of battery cells and a first heat blocking member configured to block heat propagation between the plurality of battery cells are stacked; and a second heat blocking member disposed between the cell stack and the housing, wherein at least a portion of the first heat blocking member is in contact with the second heat blocking member.

In some embodiments of the disclosed technology, the plurality of battery cells and the first heat blocking member may be stacked in a first direction, and the second heat blocking member may face the cell stack in a second direction, perpendicular to the first direction.

In some embodiments of the disclosed technology, at least a portion of the first heat blocking member may protrude in a direction toward the second heat blocking member.

In some embodiments of the disclosed technology, at least a portion of the first heat blocking member may be inserted into the second heat blocking member.

In some embodiments of the disclosed technology, the second heat blocking member may be configured to press at least a portion of the first heat blocking member in the second direction.

In some embodiments of the disclosed technology, the battery module may further include: a busbar electrically connected to the plurality of battery cells; and a busbar frame supporting the busbar, wherein at least a portion of the busbar frame faces the cell stack in the second direction.

In some embodiments of the disclosed technology, the busbar frame may include: a first frame to which the busbar is coupled; and a second frame connected to the first frame and disposed between the second heat blocking member and the housing.

In some embodiments of the disclosed technology, the second frame may include a thermoplastic resin.

In some embodiments of the disclosed technology, the second frame may have a plate-like shape covering a surface of the second heat blocking member facing the housing.

In some embodiments of the disclosed technology, the housing may include a venting hole configured to allow gas occurring in the cell stack to be discharged therethrough.

In some embodiments of the disclosed technology, the busbar frame may include a venting gap disposed between the first frame and the second frame and configured to allow gas occurring in the cell stack to pass therethrough.

In some embodiments of the disclosed technology, the venting hole may face the venting gap.

In some embodiments of the disclosed technology, the first heat blocking member includes: a heat insulating member configured to block heat propagation between adjacent battery cells; and one or more compression members facing the heat insulating member and configured to be elastically deformed.

In some embodiments of the disclosed technology, the heat insulating member may protrude in a direction toward the second heat blocking member.

In some embodiments of the disclosed technology, the protrusion of the heat insulating member may be inserted into the second heat blocking member.

In some embodiments of the disclosed technology, the heat insulating member may include at least one of mica, silica, graphite, silicate, ceramic wool, or aerogel.

In some embodiments of the disclosed technology, the one or more compression members may be coupled to one surface of the heat blocking member and the other surface of the heat blocking member opposite to the one surface of the heat insulating member, respectively.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
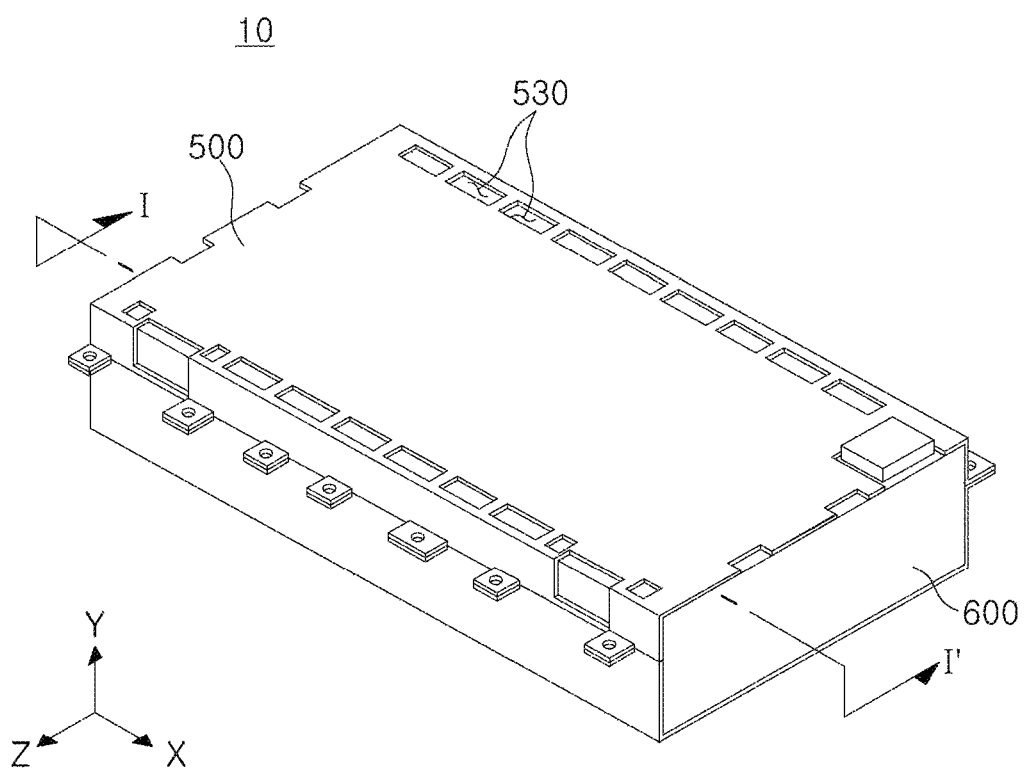
FIG. 1 is a perspective view of a battery module.

Prior to the description of the present disclosure, terms and words used in the present specification and claims to be described below should not be construed as limited to ordinary or dictionary terms, and should be construed in accordance with the technical idea of the present disclosure based on the principle that the inventors may properly define their own inventions in terms of terms in order to best explain the invention. Therefore, the embodiments described in the present specification and the configurations illustrated in the drawings are merely the most preferred embodiments of the present disclosure and are not intended to represent all of the technical ideas of the present disclosure, and thus should be understood that various equivalents and modifications may be substituted at the time of the present application.

The same reference numerals or symbols respectively illustrated in the attached drawings denote parts or elements that perform the actually same functions. For convenience of description and understanding, the parts or elements will be described by using the same reference numerals or symbols even in different embodiments. In other words, although elements having the same reference numerals are all illustrated in a plurality of drawings, the plurality of drawings do not mean one embodiment.

In the following description, the singular forms are intended to include the plural forms as well, unless the context clearly indicates otherwise. It will be further understood that the terms "comprises," "comprising," etc. When used in this specification, specify the presence of stated features, integers, steps, operations, elements, and/or components, but do not preclude the presence or addition of one or more other features, integers, steps, operations, elements, components, and/or groups thereof.

In addition, in the present specification, the expressions, such as an upper side, a lower side, a side face, a rear surface, and the like, are described based on the drawings and may be expressed differently when the direction of the corresponding object is changed.

The terms including ordinal numbers, such as 'first,' 'second,' etc. May be used herein to distinguish elements from one another. These ordinal numbers are merely used to distinguish the same or similar elements from one another, and meanings of the terms are not construed as being limited by the using of the ordinal numbers. For example, use orders or arrangement orders of elements combined with these ordinal numbers are not limited by numbers thereof. The ordinal numbers may be replaced with one another.

Hereinafter, embodiments of the present disclosure will now be described in detail with reference to the accompanying drawings. However, the ideas of the present disclosure are not limited thereto and those skilled in the art who understand the ideas of the present disclosure may easily propose any other embodiments within the scope of the present disclosure and any other degenerative invention through addition, change, deletion, and the like, and those embodiments will also be within the scope of the present disclosure. Thus, in the drawings, the shapes and dimensions of elements may be exaggerated for clarity.

Figure 2:
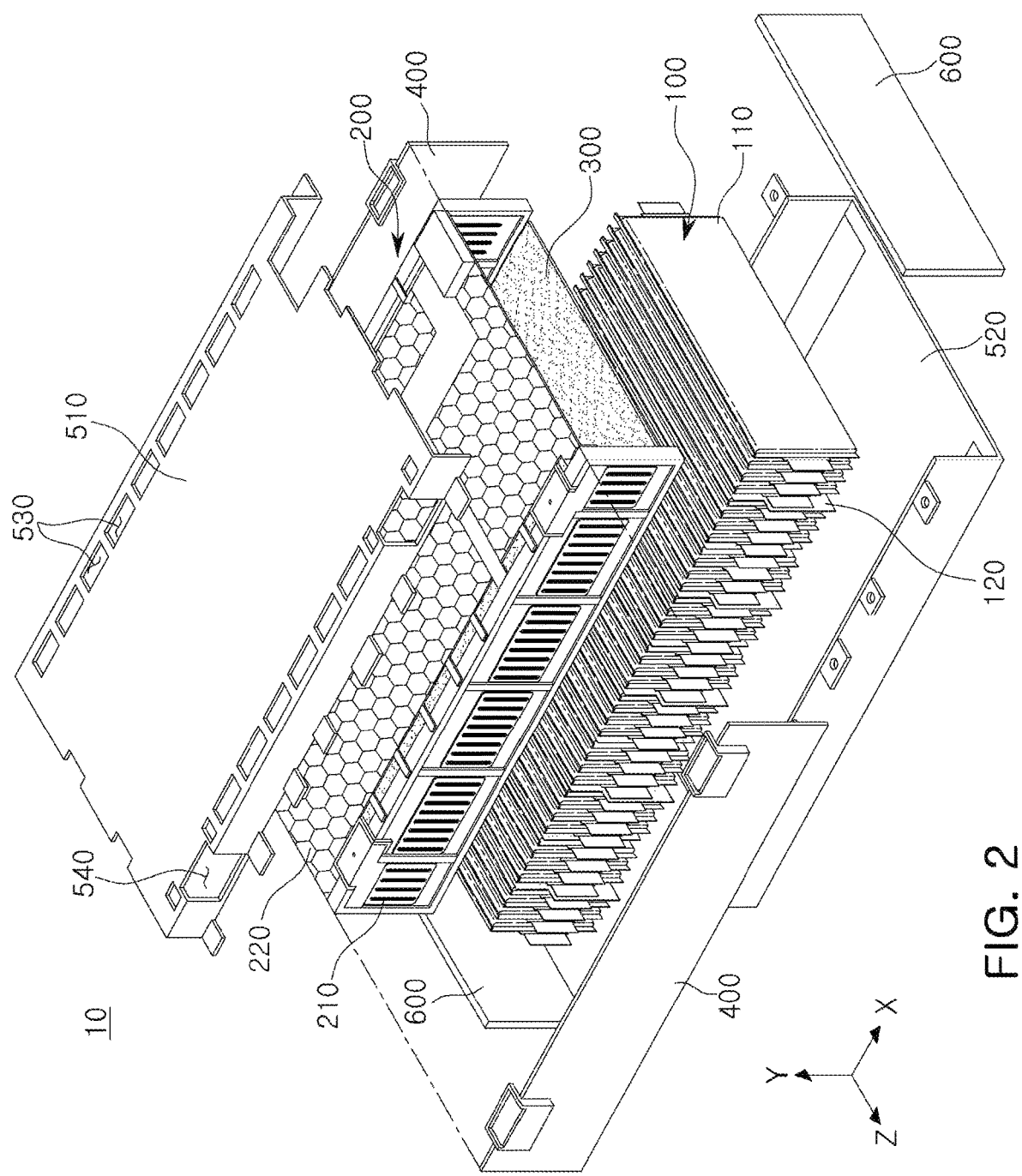
FIG. 2 is an exploded perspective view of a battery module.

Referring to FIGS. 1 and 2, a battery module 10 according to exemplary embodiments will be described. FIG. 1 is a perspective view of the battery module 10 and FIG. 2 is an exploded perspective view of the battery module 10.

The battery module 10 may include a housing 500 having an internal space, a plurality of battery cells 110 accommodated in the internal space, a busbar assembly 200 electrically connected to the battery cells 110, and an end cover 600 coupled to at least one side of the housing 500.

The plurality of battery cells 110 accommodated in the battery module 10 may be stacked in one direction (e.g., an X-axis direction of FIG. 2) to form at least a portion of the cell stack 100. Each battery cell 110 may output or store electrical energy. In the cell stack 100, the battery cells 110 may be electrically connected to each other.

As a large number of battery cells 110 are stacked in the battery module 10, there may be a risk that an event situation occurring in one battery cell 110 is transferred to another battery cell. In addition, high-temperature gases or flames occurring from in the battery cell 110 may flow irregularly in an internal space of the housing 500 and apply an impact to the battery module 10. For example, gases or flames may damage components inside the battery module 10, while flowing between the cell stack 100 and the housing 500, and there may be a possibility in which a short circuit may occur between the components inside the battery module 10 due to conductive particles. In addition, while gases or flames flow between the cell stack 100 and the housing 500, an unintended heat propagation path may be formed, which may further aggravate a thermal runaway situation.

To prevent this, the battery module 10 may include a first heat blocking member 120 and a second heat blocking member 300.

For example, the cell stack 100 may include the first heat blocking member 120 disposed between the battery cells 110. The first heat blocking member 120 may prevent heat propagation between neighboring battery cells 110. The first heat blocking member 120 may serve to protect the battery cell 110 from physical and thermal shock. For example, the first heat blocking member 120 may be configured to block heat propagation from one battery cell 110 to another battery cell 110 or absorb expansion pressure of the battery cell 110.

The plurality of battery cells 110 and the plurality of first heat blocking members 120 may be stacked in various directions to form the cell stack 100. For example, as illustrated in FIG. 2, the plurality of battery cells 110 and a plurality of protection members may be stacked on a lower case 520 of the housing 500 in a horizontal direction (the X-axis direction in FIG. 2). However, FIG. 2 is only an example, and the plurality of battery cells 110 and the plurality of protection members may be stacked in a direction (a Y-axis or Z-axis direction in FIG. 2), perpendicular to a lower case 520 of the housing 500. In the following description, the stacking direction of the battery cells 110 is referred to as a first direction or a cell stacking direction.

Alternatively, the battery module 10 may include a second heat blocking member 300 facing at least one side of the cell stack 100. The second heat blocking member 300 may cover one side of the cell stack 100 to prevent formation of an unexpected heat propagation path between the cell stack 100 and the housing 500.

The plurality of battery cells 110 included in the cell stack 100 may be electrically connected to each other through the busbar assembly 200. At least a portion of the busbar assembly 200 may be disposed to face the cell stack 100 in a direction, perpendicular to the cell stacking direction.

The busbar assembly 200 may include a busbar 210 electrically connecting one battery cell 110 and another battery cell 110 and a busbar frame 220 supporting the busbar 210.

The busbar 210 may be formed of a conductive material and serves to electrically connect the plurality of battery cells 110 to each other. The busbar 210 may be bonded to and electrically connected to a lead tab 113 (e.g., 113 of FIG. 3) of the battery cell 110. Various welding methods including laser welding may be applied to the connection between the busbar 210 and the lead tab (e.g., 113 of FIG. 3). However, the connection method is not limited to welding, and any connection method capable of electrically conducting two metallic materials may be used.

The busbar assembly 200 may include a terminal unit 230 electrically connected to an external circuit of the battery module 10. The terminal unit 230 may be exposed to the outside of the battery module 10 through an opening 540 of the housing 500.

The battery module 10 may further include a sensing module (not shown) connected to the busbar assembly 200. The sensing module (not shown) may include a temperature sensor or a voltage sensor. The sensing module (not shown) may sense a state of the battery cell 110 and output sensed information to the outside of the battery module 10.

The housing 500 provides an internal space in which one or more cell stacks 100 may be accommodated. The housing 500 may be formed of a material having predetermined rigidity to protect the cell stack 100 and other electrical components accommodated in the internal space from external impact. For example, the housing 500 may include a metal material, such as aluminum.

The housing 500 may include a lower case 520 and an upper case 510 coupled to each other. However, a structure of the housing 500 is not limited thereto, and may have any shape as long as the structure has an internal space in which at least one cell stack 100 may be accommodated. For example, the housing 500 may be configured as an integral monoframe in which the upper case 510 and the lower case 520 are integrally formed and both sides are open.

The housing 500 may include a venting hole 530 through which gas generated by the cell stack 100 is discharged. For example, the venting hole 530 may have a shape of a hole passing through the lower case 520 or the upper case 510.

A shielding member may be disposed in the venting hole 530. The shielding member may be formed of a thin film or sheet, and may block foreign matter from being introduced from the outside of the battery module 10. The shielding member may include a material that is lightweight and has excellent impact resistance, heat resistance, or electrical insulation. For example, the shielding member may include a polycarbonate sheet. In the case of thermal runaway of the battery module 10, at least a portion of the shielding member may be torn so that gas emitted from the cell stack 100 may pass therethrough appropriately.

The end cover 600 may be coupled to one open side of the housing 500. For example, as illustrated in FIG. 2, the end cover 600 may be provided as a pair and the pair of end covers 600 may be coupled to both sides of the housing 500, respectively.

In order to prevent an electrical short circuit between the busbar assembly 200 and the housing 500, the battery module 10 may include an insulating cover 400. For example, as illustrated in FIG. 2, the insulating cover 400 may be disposed to face the busbar assembly 200 between the busbar assembly 200 and the housing 500. The insulating cover 400 may include an insulating material, and thus may prevent electrical connection between the busbar assembly 200 and the housing 500. For example, the insulating cover 400 may be formed of a plastic injection molding material including polypropylene or modified polyphenylene oxide (MPPO). However, a material of the insulating cover 400 is not limited thereto. As the insulating cover 400 is disposed, it is possible to prevent an electrical short circuit from occurring between the cell stack 100 and the housing 500 or between the busbar 210 and the housing 500.

A heat dissipation member (not shown) may be disposed between the cell stack 100 and the housing 500. The heat dissipation member (not shown) may be disposed such that one surface thereof is in contact with the cell stack 100 and the other surface opposite to the one surface is in contact with the housing 500. The heat dissipation member (not shown) may be provided as a thermal adhesive. A heat dissipation member (not shown) may fill a space between the cell stack 100 and the housing 500 so that heat transfer by conduction may be more actively performed. Accordingly, heat dissipation efficiency of the battery module 10 may be increased.

Figure 4:
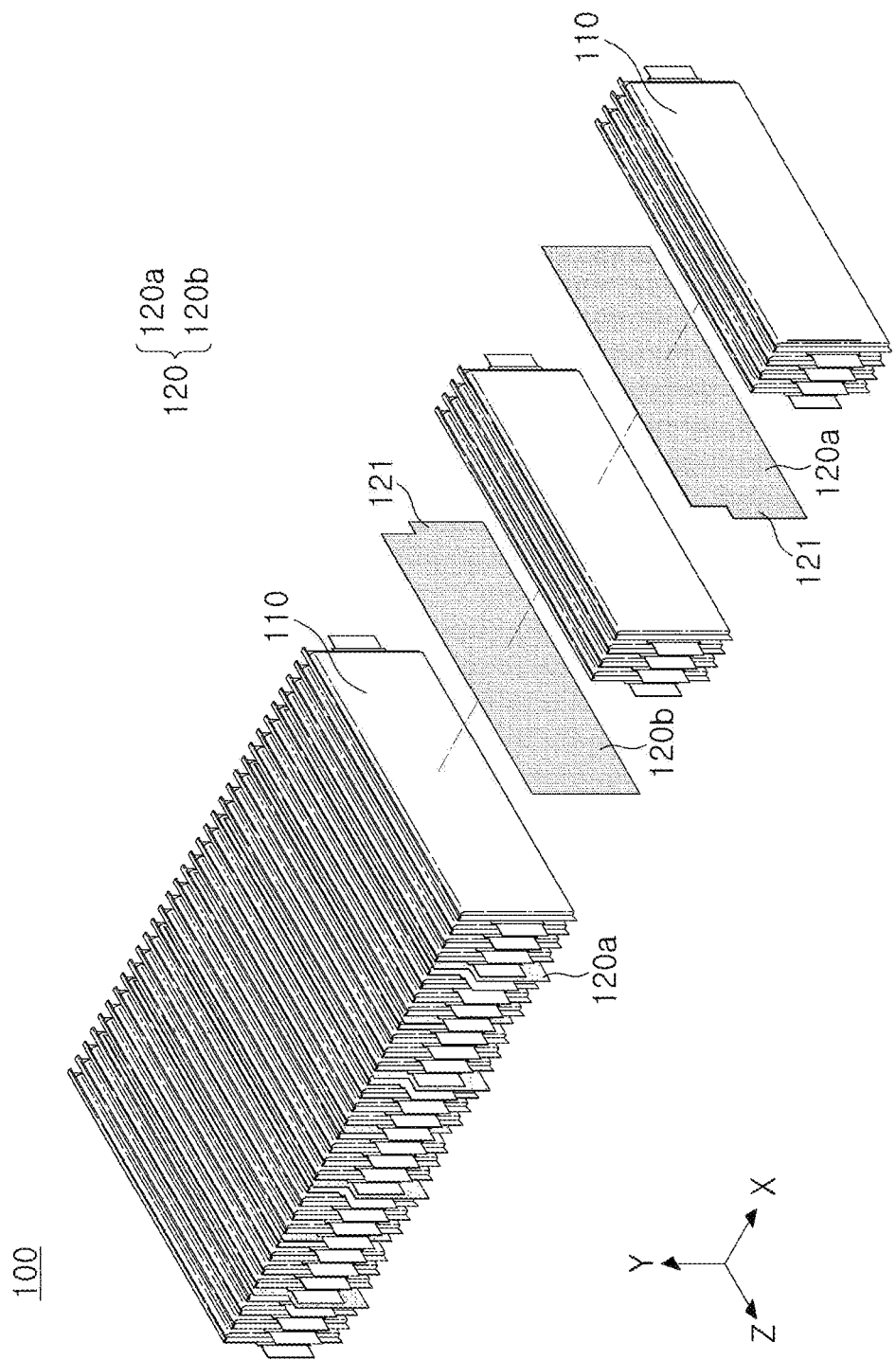
FIG. 4 illustrates an exemplary configuration of a cell stack.
Figure 5:
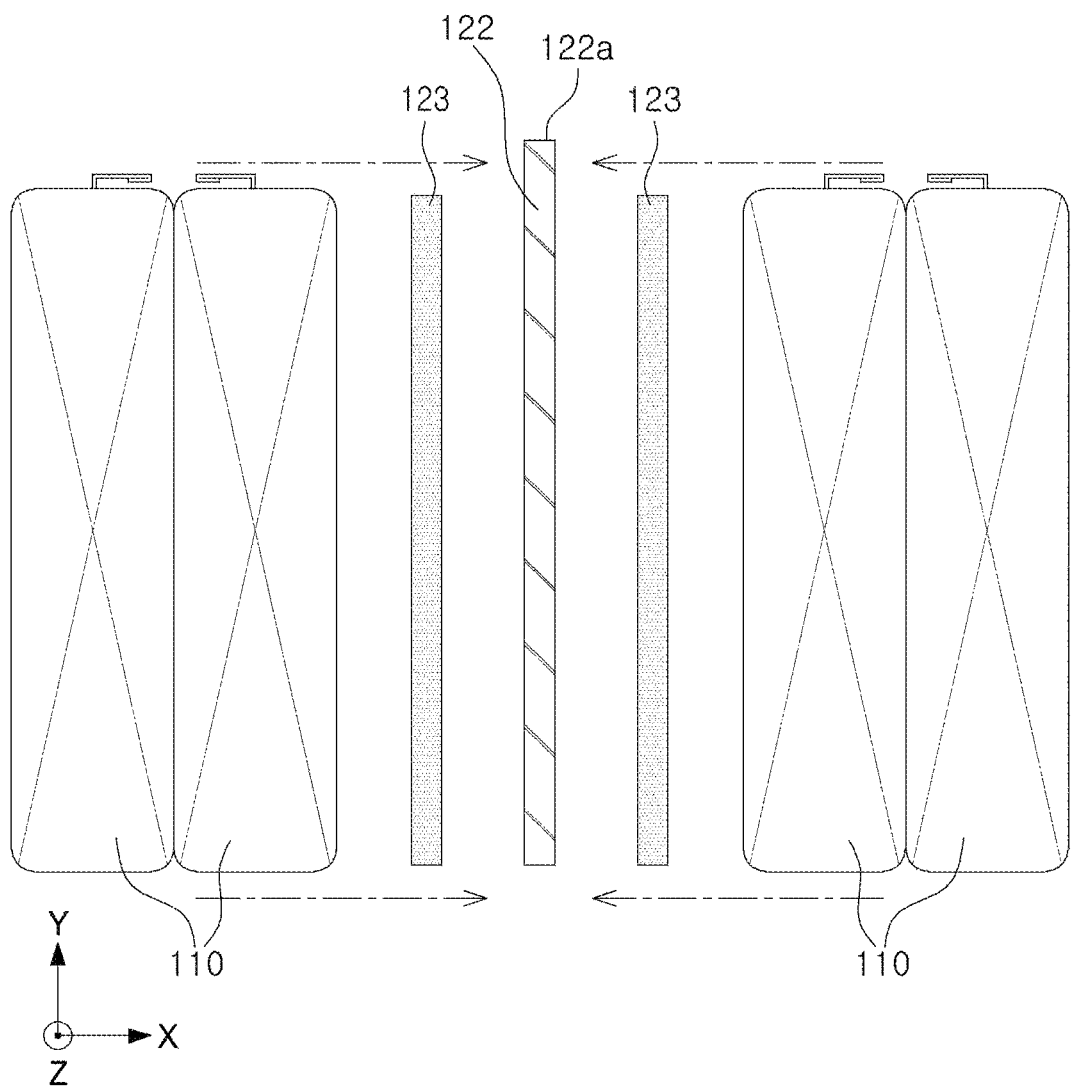
FIG. 5 illustrates how battery cells and a first heat blocking member are stacked.

Hereinafter, the cell stack 100 included in the battery module (e.g., 10 in FIGS. 1 and 2) will be described with reference to FIGS. 3 to 5.

Figure 3:
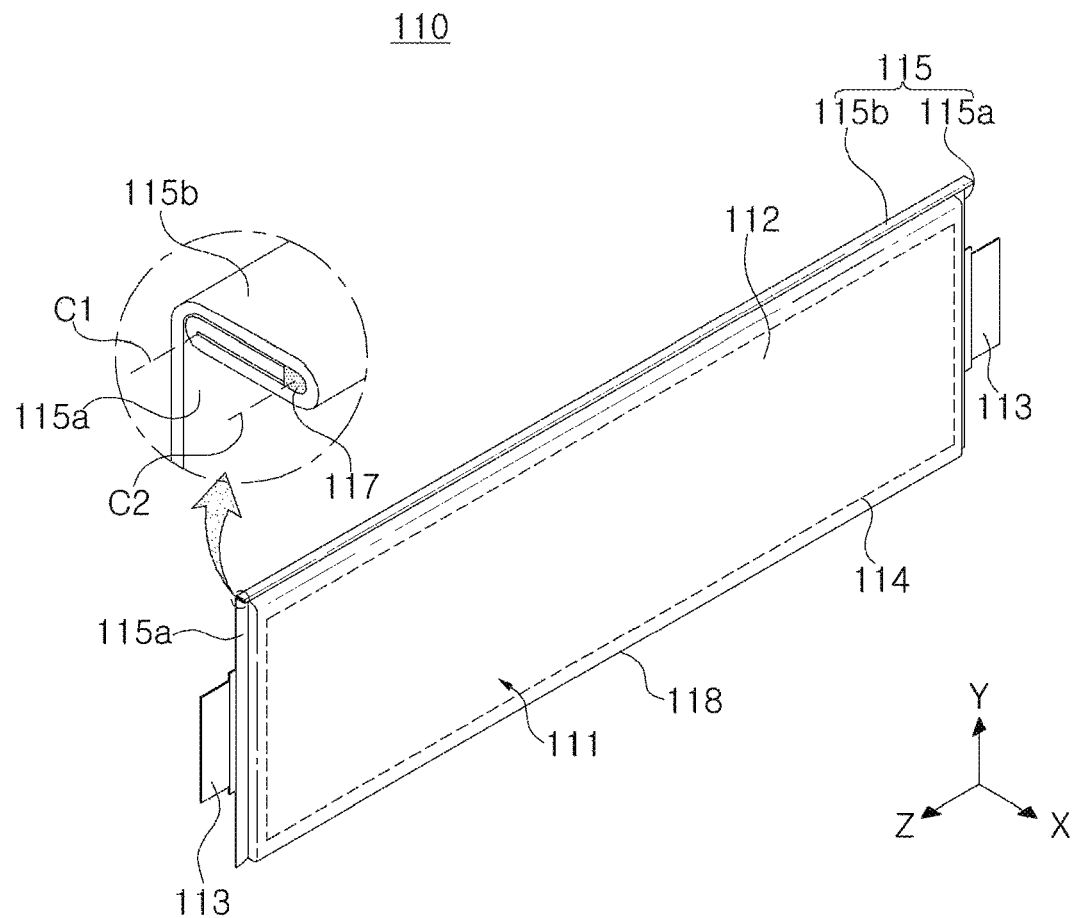
FIG. 3 is a perspective view of a battery cell included in a cell stack.

FIG. 3 is a perspective view of the battery cell 110 included in the cell stack 100. FIG. 4 illustrates a configuration of the cell stack 100. FIG. 5 illustrates how the battery cell 110 and the first heat blocking member 120 are stacked. The battery cell 110, the first heat blocking member 120, and the cell stack 100 described with reference to FIGS. 3 to 5 correspond to the battery cell 110, the first heat blocking member 120, and the cell stack 100 described above with reference to FIGS. 1 and 2, redundant descriptions may be omitted.

The cell stack 100 may include one or more battery cells 110. The battery cell 110 may be configured to convert chemical energy into electrical energy to supply power to an external circuit, or to receive power supplied from the outside and convert electrical energy into chemical energy to store electricity. For example, the battery cell 110 may be configured as a nickel metal hydride (Ni-MH) battery or a lithium ion (Li-ion) battery capable of charging and discharging, but is not limited thereto. In embodiments, a plurality of battery cells 110 may be stacked side by side and electrically connected to each other.

The battery cell 110 included in the cell stack 100 may be a pouch-type battery cell. Referring to FIG. 3, the battery cell 110 may include an electrode accommodating portion 112 configured to accommodate an electrode assembly 114 in a pouch 111 and a plurality of lead tabs 113 electrically connected to the electrode assembly 114 and exposed to the outside of the pouch 111.

The electrode assembly 114 may include a plurality of electrode plates. Here, the electrode plates may include a positive electrode plate and a negative electrode plate. The electrode assembly 114 may be configured in a form in which a positive electrode plate and a negative electrode plate are stacked with a separator interposed therebetween. Each of a plurality of positive electrode plates and a plurality of negative electrode plates may include an uncoated portion to which an active material is not applied, and the uncoated regions may be connected such that the same polarities are in contact with each other. The uncoated portions having the same polarity may be electrically connected to each other and electrically connected to other components outside the battery cell 110 through the lead tab 113. In the case of the battery cell 110 illustrated in FIG. 3, the two lead tabs 113 are drawn out from the electrode accommodating portion 112 in opposite directions, but the lead tabs 113 may also be configured to be drawn out from either side of the electrode accommodating portion 112 in the same direction.

The pouch 111 surrounds the electrode assembly 114, forms the exterior of the electrode accommodating portion 112, and provides an internal space in which the electrode assembly 114 and an electrolyte (not shown) are accommodated. The pouch 111 may be formed by folding a sheet of exterior material. For example, the pouch 111 may be configured such that a sheet of exterior material is folded in half and the electrode assembly 114 is accommodated therebetween. The exterior material may be formed of a material capable of protecting the electrode assembly 114 from an external environment, and may include, for example, an aluminum film.

An exterior material may be bonded to an edge of the pouch 111 to form a sealing portion 115. A thermal fusion method may be used to bond the exterior material for forming the sealing portion 115, but is not limited thereto.

The sealing portion 115 may be divided into a first sealing portion 115a formed in a position at which the lead tab 113 is disposed and a second sealing portion 115b formed in a position at which the lead tab 113 is not disposed. In order to increase reliability of bonding of the sealing portion 115 and to minimize an area of the sealing portion 115, at least a portion of the sealing portion 115 may be formed to be folded one or more times. For example, the second sealing portion 115b may be folded by 180° along a first bending line C1 and then folded along a second bending line C2 again. Here, a bent portion of the second sealing portion 115b may be filled with an adhesive member 117. Accordingly, a twice-folded shape of the second sealing portion 115b may be maintained by the adhesive member 117. The adhesive member 117 may be formed of an adhesive having high thermal conductivity. For example, the adhesive member 117 may be formed of epoxy or silicone, but is not limited thereto.

The sealing portion 115 may not be formed on a surface in which the pouch 111 is folded along one edge of the electrode assembly 114. A portion in which the pouch 111 is folded along one edge of the electrode assembly 114 is defined as a folding portion 118 to be distinguished from the sealing portion 115. That is, the pouch-type battery cell 110 has the sealing portion 115 on three out of four edges of the pouch 111, and the folding portion 118 is formed on the remaining one side, having a form of a three-sided sealing pouch 111.

The battery cell 110 of the embodiments is not limited to the three-sided sealing pouch 111 described above. For example, it is also possible to form the pouch 111 by overlapping two sheets of different exterior materials and to form the sealing portion 115 on all four sides around the pouch 111. For example, the sealing portion 115 may include the sealing portions 115 of two sides in which the lead tab 113 is disposed and the sealing portion 115 of the other two sides in which the lead tab 113 is not disposed.

In addition, the battery cell 110 included in the battery module 10 of the embodiments is not limited to the pouch-type battery cell described above, and may be configured as a cylindrical battery cell or a prismatic battery cell.

The cell stack 100 may include a plurality of battery cells 110 and a plurality of first heat blocking members 120. Referring to FIG. 4, the plurality of first heat blocking members 120 may be arranged side by side at predetermined intervals in the cell stacking direction (e.g., the X-axis direction of FIG. 4). One or more battery cells 110 may be disposed between two adjacent first heat blocking members 120. In the drawing, four battery cells 110 are stacked between the two first heat blocking members 120, but this is only an example, and three or less or five or more battery cells 110 may be disposed between the two first heat blocking members 120.

The first heat blocking member 120 may include an insertion portion 121 inserted into the busbar assembly (e.g., 200 of FIG. 2). Referring to FIG. 4, the first heat blocking member 120 may include the insertion portion 121 protruding in a direction (e.g., the Z-axis direction) toward the busbar (e.g., 210 in FIG. 2). At least a portion of the insertion portion 121 may be inserted into the busbar assembly 200. For example, at least a portion of the insert 121 may be inserted into the busbar frame 220.

The insertion portion 121 may be inserted into the busbar frame 220 by avoiding the busbar 210. For example, an insertion position of the insertion portion 121 may be between two busbars 210 adjacent to each other. That is, the insertion portion 121 of the first heat blocking member 120 may be inserted into the busbar frame 220 and disposed between two adjacent busbars 210. Accordingly, the insertion portion 121 may prevent the two busbars 210 from physically contacting each other.

The insertion portion 121 may be formed at either edge of the first heat blocking member 120. When a plurality of first heat blocking members 120 are disposed in the cell stacking direction, the first heat blocking member 120 having the insertion portion 121 at one end and the first heat blocking member 120 having the insertion portion 121 at the other end thereof may be alternately disposed. For example, as illustrated in FIG. 4, in the cell stack 100 in which the plurality of first heat blocking members 120 are disposed in the X-axis direction, the insertion portion 121 of one of the first heat blocking members 120 may be disposed to face in a positive Z-axis direction, and the insertion portion 121 of another first heat blocking member 120 adjacent thereto may be disposed to face in a negative Z-axis direction. According to this arrangement structure, the insertion portion 121 of the first heat blocking member 120 may be inserted into the busbar frame 220 by avoiding the busbar 210.

The first heat blocking member 120 may include a combination of members having different properties. For example, referring to FIG. 5, the first heat blocking member 120 may include a heat insulating member 122 and a compression member 123 coupled to each other.

The first heat blocking member 120 may include one or more heat insulating members 122 to block heat and/or flame propagation between adjacent battery cells 110.

The heat insulating member 122 may include a material having at least one of flame retardancy, heat resistance, heat insulation, and insulating properties. Here, heat resistance may refer to properties that do not melt and do not change in shape even at a temperature of 300° C. or higher, and heat insulation may refer to properties having a thermal conductivity of 1.0 W/mK or less. For example, the heat insulating member 122 may include at least one of the following materials: mica sheet, silicate, graphite, alumina, ceramic wool or super wool, and aerogel. (Aerogel).

However, the material of the heat insulating member 122 is not limited to the materials mentioned above, and the heat insulating member 122 may be formed of any material capable of maintaining a shape in a thermal runaway situation of the battery cell 110 and preventing heat or flames from propagating to other adjacent battery cells 110.

In order to increase an energy density of the cell stack 100, a thickness of the heat insulating member 122 may be smaller than a thickness of one battery cell 110. Here, the thickness may refer to a length in the cell stacking direction.

The first heat blocking member 120 may further include one or more compression members 123 fixed to the heat insulating member 122. The compression member 123 may have a predetermined elastic force to press the battery cell 110, thereby preventing the battery cell 110 from swelling. For example, the compression member 123 may include at least one of polyurethane, silicone, and rubber (e.g., ethylene-propylene diene monomer (EPDM)), and may press the battery cell 110 using elasticity of these materials.

The compression member 123 may be disposed such that one surface thereof faces the battery cell 110 and the other surface thereof opposite to the one surface faces the heat insulating member 122. For example, as illustrated in FIG. 5, the first heat blocking member 120 may have a sandwich structure in which a plurality of compression members 123 are disposed with the heat insulating member 122 interposed therebetween.

An area of the compression member 123 may be equal to or greater than an area of an electrode accommodating portion (e.g., 112 of FIG. 3) of the battery cell 110 facing the compression member 123. Accordingly, the compression member 123 may effectively absorb and buffer expansion pressure caused by swelling of the battery cell 110.

One or more compression members 123 may be disposed on different surfaces of the heat insulating member 122. For example, as illustrated in FIG. 5, the first heat blocking member 120 may include compression members 123 disposed on both sides of the heat insulating member 122 based on the heat insulating member 122.

The first heat blocking member 120 may further include a fixing member (not shown) disposed on at least one side of the compression member 123. For example, the fixing member (not shown) may be disposed between the heat insulating member 122 and the compression member 123 and between the battery cell 110 and the compression member 123. The fixing member (not shown) may include a material having adhesive strength, for example, a silicone-based, acrylic-based, rubber-based, hot-melt-based, epoxy-based, PSA-based, or urethane-based material. The fixing member (not shown) may be a substrate-type, an inorganic material-type, or a pressure sensitive adhesive (PSA) hot melt-type an adhesive tape.

One surface of the compression member 123 may face one surface of the heat insulating member 122, and in this case, an area of one surface of the compression member 123 may be smaller than or equal to an area of one surface of the heat insulating member 122. For example, the area of a surface of the heat insulating member 122, perpendicular to the first direction, may be greater than or equal to the area of the compression member 123 opposite thereto. Accordingly, as illustrated in FIG. 5, at least a portion of the heat insulating member 122 may protrude further than the compressive member 123 in a second direction (e.g., the Y-axis direction), perpendicular to the first direction (e.g., the X-axis direction). In this case, the second direction may be a direction from the cell stack 100 toward the upper case (e.g., 510 in FIG. 2) or the lower case (e.g., 520 in FIG. 2). In this manner, the portion in which the heat insulating member 122 protrudes in the second direction is defined as a protrusion 122a of the heat insulating member 122.

The area of one surface of the compression member 123 may correspond to the area of the electrode accommodating portion 112 of the battery cell 110, and accordingly, the area of the heat insulating member 122 facing the one surface of the compression member 123 may be greater than or equal to the area of the electrode accommodating portion 112 of the battery cell 110. In this case, the battery cells 110 adjacent to each other with the heat insulating member 122 interposed therebetween may not directly face each other. Therefore, the first heat blocking member 120 may effectively prevent propagation of high-temperature thermal energy or frames occurring due to thermal runaway of the battery cell 110 disposed on one side of the heat insulating member 122 to the battery cell 110 disposed on the other side of the heat insulating member 122.

The protrusion 122a of the heat insulating member 122 may be configured to protrude in a direction toward the housing (e.g., 500 in FIG. 2). For example, as illustrated in FIG. 5, the protrusion 122a of the heat insulating member 122 may protrude further in the second direction (the Y-axis direction) than the compression member 123 and the battery cell 110.

When another component (e.g., the second heat blocking member 300 described in FIG. 2) is disposed above or below the cell stack 100, the other component may be strongly in contact with the protrusion 122a of the heat insulating member 122, among the components of the cell stack 100. With this structure, it is possible to more effectively prevent high-temperature gas or flames occurring in the battery cell 110 from being transferred to other battery cells 110 beyond the heat insulating member 122.

Figure 6:
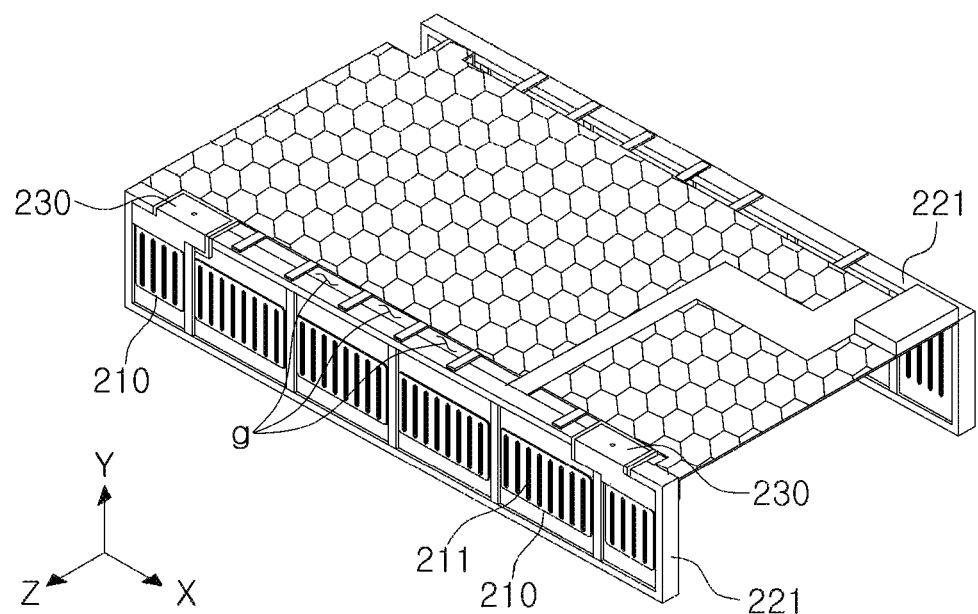
FIG. 6 is a perspective view of a busbar assembly included in a battery module.

Hereinafter, the busbar assembly 200 included in the battery module (e.g., 10 in FIGS. 1 and 2) will be described with reference to FIG. 6. FIG. 6 is a perspective view of the busbar assembly 200 included in the battery module 10. The busbar assembly 200 described with reference to FIG. 6 corresponds to the busbar assembly 200 described above with reference to FIGS. 1 to 5, and redundant descriptions may be omitted.

A plurality of battery cells 110 included in the battery module 10 may be electrically connected to each other through the busbar assembly 200.

The busbar assembly 200 may include the conductive busbar 210 electrically connected to the battery cell 110 and the busbar frame 220 supporting the busbar 210.

A plurality of busbars 210 may be disposed on the busbar frame 220 and arranged side by side in the cell stacking direction (e.g., the X-axis direction). Each busbar 210 may include a slit hole 211 into which the lead tabs 113 of the plurality of battery cells 110 are inserted and welded.

The busbar frame 220 may structurally support the busbar 210 even in an external shock or vibration situation. For example, the busbar frame 220 may include a plastic material which is lightweight and has excellent mechanical strength, such as polypropylene, polybutylene terephthalate, and modified polyphenylene oxide (MPPO), and accordingly, the busbar frame 220 may structurally support the busbar 210, while securing insulating properties.

The busbar 210 may be fixed to the busbar frame 220 in various manners. For example, the busbar 210 may be fixed to the busbar frame 220 by a heat welding process or an insert injection process.

The busbar frame 220 may include a first frame 221 on which the busbar 210 is disposed and a second frame 222 disposed between the cell stack 100 and the housing 500. For example, referring to FIG. 6, the busbar assembly 200 may include a pair of first frames 221 facing each other and a second frame 222 connected to both the pair of first frames 221.

A venting gap g, which is a space through which gas may pass, may be formed between the first frame 221 and the second frame 222. Gas or flames occurring in the cell stack 100 may pass through the busbar assembly 200 through the venting gap g and flow toward the venting hole 530 of the housing (e.g., 500 in FIG. 2). For smooth gas discharge, the venting hole (e.g., 530 in FIG. 2) of the housing 500 may be disposed to face the venting gap g of the busbar assembly 200.

Figure 7:
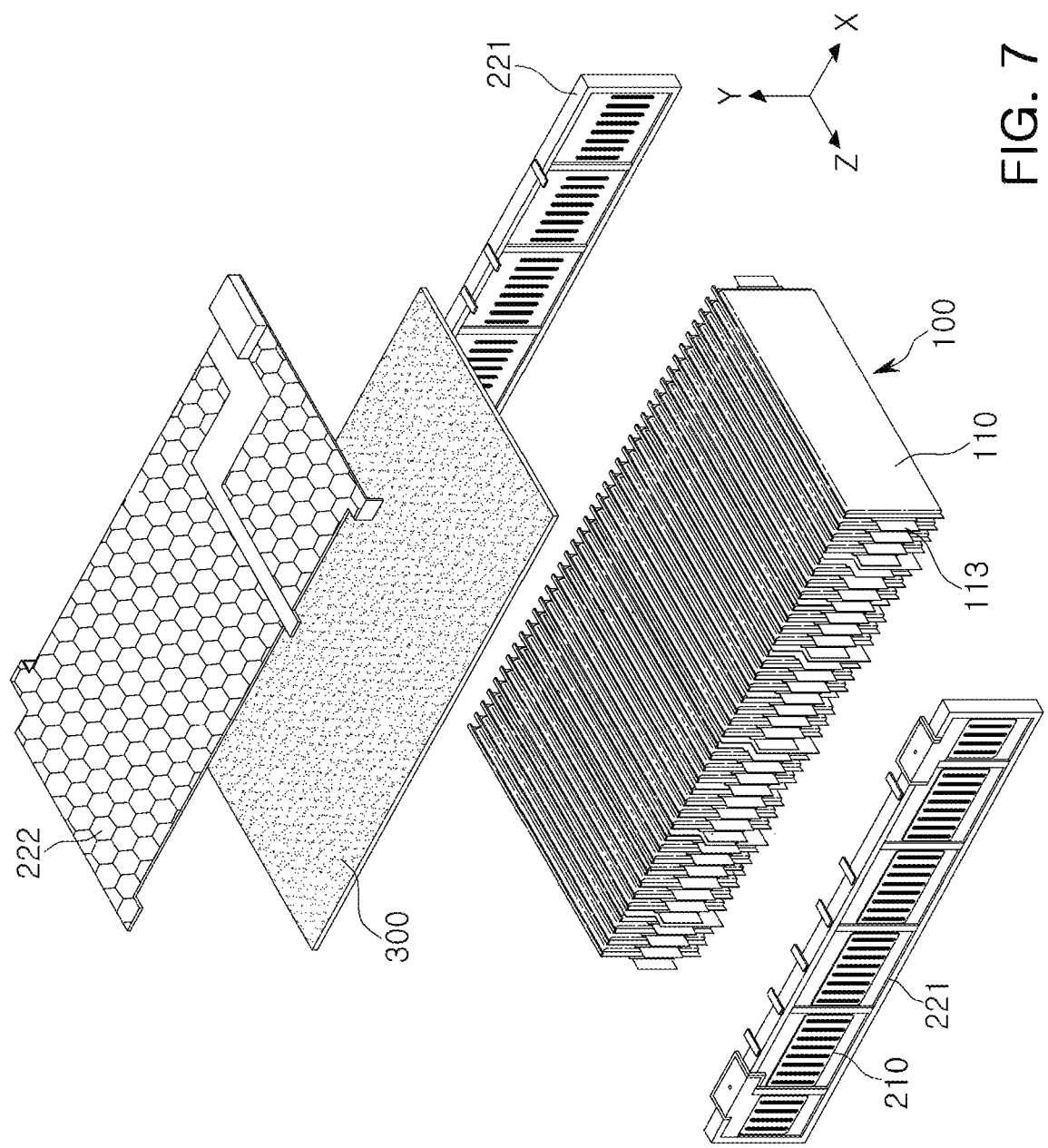
FIG. 7 illustrates the arrangement of a cell stack, a second heat blocking member, and a busbar assembly.
Figure 8:
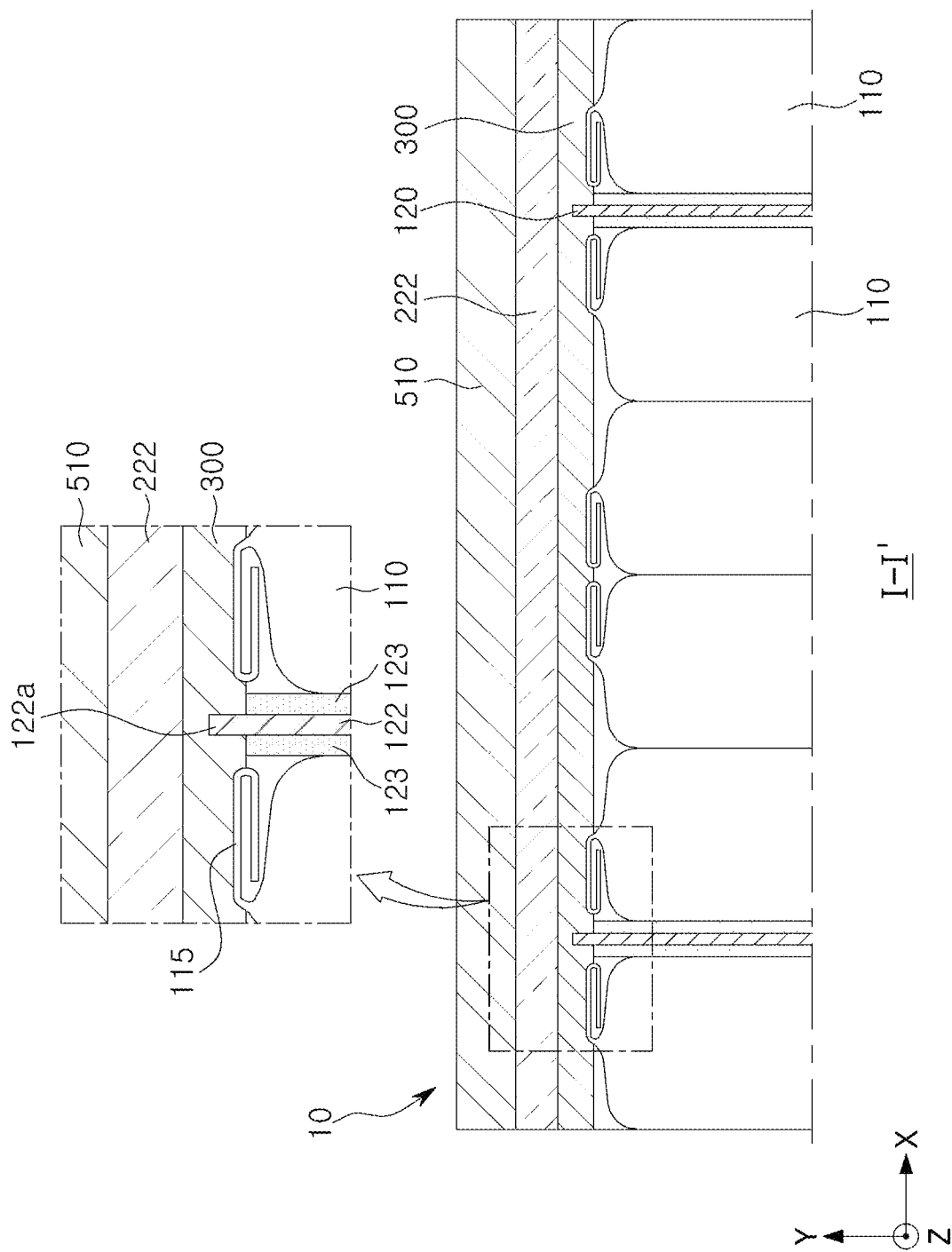
FIG. 8 is a partial cross-sectional view of portion I-I' of FIG. 1.

Hereinafter, a configuration of a heat blocking member included in the battery module 10 will be described in detail with reference to FIGS. 7 and 8. FIG. 7 illustrates the arrangement of the cell stack 100, the second heat blocking member 300, and the busbar assembly 200. FIG. 8 is a partial cross-sectional view taken along line I-I' of FIG. 1. Since the battery module 10 and components thereof described with reference to FIGS. 7 and 8 correspond to the battery module 10 and the components thereof described above with reference to FIGS. 1 to 6, redundant descriptions may be omitted.

The battery module 10 may include the first heat blocking member 120 disposed between the battery cells 110 of the cell stack 100 and the second heat blocking member 300 facing at least one side of the cell stack 100.

The first heat blocking member 120 and the second heat blocking member 300 may include a material having heat insulating properties and heat resistance. Accordingly, high-temperature thermal energy or flames occurring in the battery cell 110 may not pass through the first heat blocking member 120 and the second heat blocking member 300.

The second heat blocking member 300 may be configured to cover at least one side of the cell stack 100 between the second frame 222 of the busbar assembly 200 and the cell stack 100. For example, the second heat blocking member 300 may be disposed such that one surface thereof faces a lower surface of the second frame 222 and the other surface thereof opposite to the one surface faces the cell stack 100.

The second heat blocking member 300 may include a compressible material (e.g., ceramic wool, etc.) to press the battery cells 110 of the cell stack 100 in the second direction (e.g., the Y-axis direction). For example, referring to FIG. 8, the second heat blocking member 300 may press the sealing portion 115 of the battery cell 110 to further increase sealing strength.

At least a portion of the first heat blocking member 120 may contact the second heat blocking member 300.

At least a portion of the first heat blocking member 120 may overlap or may be engaged with the second heat blocking member 300. For example, at least a portion of each of the plurality of first heat blocking members 120 spaced apart from each other in the first direction may be inserted into the second heat blocking member 300 in the second direction (the Y-axis direction) and engaged with each other. In this manner, a structure in which the first heat blocking member 120 and the second heat blocking member 300 are in contact and engaged each other is defined as an 'overlapping structure'.

In the battery module 10, at least a portion of the first heat blocking member 120 may be inserted to form an overlapping structure. For example, FIG. 8 illustrates a state in which the protrusion 122a of the first heat blocking member 120 is inserted into the second heat blocking member 300.

Alternatively, the second heat blocking member 300 including a compressible material may press at least a portion of the first heat blocking member 120 to form an overlapping structure. For example, the second heat blocking member 300 may be disposed to face the cell stack 100 in the second direction (the Y-axis direction) and press at least a portion of the cell stack 100, and accordingly, the second heat blocking member 300 may press at least a portion (e.g., an edge) of the first heat blocking member 120 in the second direction (the Y-axis direction) to form an overlapping structure.

The second heat blocking member 300 may form an overlapping structure with the heat insulating member 122 of the first heat blocking member 120. Referring to the partially enlarged view of FIG. 8, the first heat blocking member 120 may include the heat insulating member 122 and the compression member 123, and the protrusion 122a of the heat insulating member 122 may be in close contact with the second heat blocking member 300 or may be inserted into the second heat blocking member 300.

A specific shape of the overlapping structure of the first heat blocking member 120 and the second heat blocking member 300 is not limited to that illustrated in the drawings. For example, in addition to the heat insulating member 122, the compression member 123 may also be configured to be engaged with the second heat blocking member 300. Alternatively, at least a portion of the second heat blocking member 300 may protrude in a direction toward the first heat blocking member 120 to be engage with the first heat blocking member 120.

The first heat blocking member 120 and the second heat blocking member 300 may be disposed to have an overlapping structure, thereby preventing high-temperature thermal energy or flames occurring in some of the battery cells 110 from propagating to other battery cells 110 adjacent thereto and from indiscriminately flowing in a space between the cell stack 100 and the housing 500.

In particular, when the second heat blocking member 300 includes a material having both heat resistance and compressibility, such as ceramic wool, the second heat blocking member 300 may take in metallic/conductive particles occurring in a thermal runaway situation, rather than bouncing them off, so that secondary damage due to indiscriminate scattering of the particles may be prevented. In addition, since the second heat blocking member 300 has a compressible material, it may be easier for the second heat blocking member 300 to form an overlapping structure with the first heat blocking member 120, and the second heat blocking member 300 may also serve to press the battery cell 110 with a predetermined pressure.

At least a portion of the busbar frame 220 may be disposed between the second heat blocking member 300 and the housing (e.g., 500 in FIG. 2). For example, the second frame 222 configured in a plate shape capable of covering the second heat blocking member 300 may be disposed between the second heat blocking member 300 and the upper case 510 of the housing 500. In this case, one surface of the second frame 222 may face the second heat blocking member 300 and the other surface may face the upper case 510.

At least a portion of the second frame 222 of the busbar frame 220 may be melted by high-temperature thermal energy occurring in a thermal runaway situation. For example, the second frame 222 may include a thermoplastic resin material, such as polypropylene, and may be configured to be deformed in shape by high-temperature thermal energy.

In a thermal runaway situation, at least a portion of the second frame 222 may be melted by heat and entangled with the second heat blocking member 300. When strong hot air occurs inside the battery module 10 in a thermal runaway situation, there is a possibility that a portion of the second heat blocking member 300 may be lost due to the hot air. However, according to the battery module 10 of the embodiments, in a thermal runaway situation, the second frame 222 may be melted and entangled with the second heat blocking member 300 to supplement mechanical strength and minimize loss due to hot air.

As the second heat blocking member 300 is disposed between the cell stack 100 and the housing 500, an unintended heat transfer path may be prevented from being formed at an upper end of the cell stack 100 in a thermal runaway situation. Accordingly, propagation of gas or flames occurring in the cell stack 100 to other portions inside the module may be blocked.

In addition, the second heat blocking member 300 may be configured to take in combustion particles, without bouncing them off, so that impact energy due to thermal runaway may be absorbed and secondary damage due to scattering of particles may be prevented.

In addition, at least a portion of the busbar frame 220 may be disposed between the second heat blocking member 300 and the housing 500 to be entangled with the second heat blocking member 300 in a thermal runaway situation. Accordingly, loss of the second heat blocking member 300 due to hot air may be prevented.

In addition, the first heat blocking member 120 between the battery cells 110 may form an overlapping structure with the second heat blocking member 300, so that propagation of gas or flames occurring from the battery cell 110 to the other battery cells 110 may be more effectively blocked. Gas or flames occurring in the cell stack 100 may be guided to flow along a predetermined venting flow path (e.g., a flow path communicating with the venting hole 530 of the housing 500 and the venting gap g of the busbar assembly 200) by the first heat blocking member 120 and the second heat blocking member 300, and thus, thermal runaway of the battery module 10 may be easily controlled.

The battery module according to embodiments may block heat propagation between neighboring battery cells and prevent high-temperature gas or flames from indiscriminately flowing between the cell stack and the housing.

In addition, the battery module may effectively block propagation of high-temperature gas or flames occurring in the battery cells to the internal space of the battery module through a plurality of heat blocking members disposed in different directions.

In addition, the battery module may guide a flow path of high-temperature gas or flames occurring in the battery cell to a predetermined path.

Only specific examples of implementations of certain embodiments are described. Variations, improvements and enhancements of the disclosed embodiments and other embodiments may be made based on the disclosure of this patent document.

What is claimed is:

1. A battery module comprising:
a housing having an internal space;
a cell stack includes a plurality of battery cells accommodated in the internal space and stacked in a first direction, the cell stack includes a first side where lead tabs of the plurality of battery cells are disposed, a second side facing the first direction, and an upper side and a lower side opposing each other in a second direction perpendicular to the first direction;
a first heat blocking member disposed between the plurality of battery cells, the first heat blocking member is configured to block heat propagation between the plurality of battery cells; and
a second heat blocking member extending between (a) the housing and (b) at least one of the upper side or the lower side of the cell stack,
wherein at least a portion of the first heat blocking member is inserted into the second heat blocking member.

2. The battery module of claim 1, wherein
the plurality of battery cells and the first heat blocking member are stacked in the first direction, and
the second heat blocking member faces the cell stack in the second direction.

3. The battery module of claim 2, wherein at least a portion of the first heat blocking member protrudes in the second direction.

4. The battery module of claim 1, further comprising:
at least one busbar electrically connected to the plurality of battery cells; and
a first frame disposed between the lead tabs and the housing and supporting the at least one busbar,
wherein the first heat blocking member includes an insertion portion protruding toward the first frame, and the insertion portion is inserted into the first frame.

5. The battery module of claim 2, wherein the second heat blocking member is configured to press at least a portion of the first heat blocking member in the second direction.

6. The battery module of claim 2, further comprising:
at least one busbar electrically connected to the plurality of battery cells and faces the front side of the cell stack in the second direction; and
a busbar flame including a first frame disposed to support the at least one busbar and a second frame connected to the first frame and disposed between the housing and the front side of the cell stack,
wherein the first frame is disposed to face the cell stack in a third direction, perpendicular to both the first and the second direction, and
wherein the second frame is disposed to face the cell stack in the second direction.

7. The battery module of claim 6, wherein at least the portion of the first heat blocking member protrudes toward the second frame to be inserted into the second heat blocking member.

8. The battery module of claim 1, wherein the second heat blocking member includes ceramic wool, and the second frame includes a thermoplastic resin.

9. The battery module of claim 6, wherein the second frame has a plate-like shape covering a surface of the second heat blocking member facing the housing.

10. The battery module of claim 1, wherein the housing includes a venting hole configured to allow gas occurring in the cell stack to be discharged therethrough.

11. The battery module of claim 10, further comprising:
at least one busbar electrically connected to the plurality of battery cells; and
a busbar frame including a first frame disposed to support the at least one busbar and a second frame connected to the first frame and disposed between the housing and the front side of the cell stack,
wherein the busbar frame includes a venting gap disposed between the first frame and the second frame and configured to allow gas occurring in the cell stack to pass therethrough, and
the venting hole faces the venting gap.

12. The battery module of claim 1, wherein the first heat blocking member includes:
a heat insulating member configured to block heat propagation between adjacent battery cells; and
one or more compression members facing the heat insulating member and configured to be elastically deformed.

13. The battery module of claim 12, wherein the heat insulating member includes a protrusion protruding in a direction toward the second heat blocking member.

14. The battery module of claim 13, wherein the protrusion of the heat insulating member is inserted into the second heat blocking member.

15. The battery module of claim 12, wherein the heat insulating member includes at least one of mica, silica, graphite, silicate, ceramic wool, or aerogel.

16. The battery module of claim 12, wherein the one or more compression members are coupled to one surface of the heat blocking member and the other surface of the heat blocking member opposite to the one surface of the heat insulating member, respectively.

* * * * *